United States Patent
Sekine (10) Patent No.: US 9,200,582 B2
(45) Date of Patent: Dec. 1, 2015

(54) FAULT DIAGNOSIS APPARATUS FOR AIRFLOW METER

(75) Inventor: Satoshi Sekine, Fujisawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 513 days.

(21) Appl. No.: 13/642,360

(22) PCT Filed: Apr. 19, 2011

(86) PCT No.: PCT/JP2011/059639
§ 371 (c)(1),
(2), (4) Date: Oct. 19, 2012

(87) PCT Pub. No.: WO2011/132678
PCT Pub. Date: Oct. 27, 2011

(65) Prior Publication Data
US 2013/0036788 A1     Feb. 14, 2013

(30) Foreign Application Priority Data

Apr. 20, 2010   (JP) ................. 2010-096582

(51) Int. Cl.
| | |
|---|---|
| *F02D 41/22* | (2006.01) |
| *F02D 45/00* | (2006.01) |
| *G01F 25/00* | (2006.01) |
| *G01F 9/02* | (2006.01) |
| *F02D 41/18* | (2006.01) |

(52) U.S. Cl.
CPC .............. *F02D 41/22* (2013.01); *F02D 45/00* (2013.01); *G01F 9/023* (2013.01); *G01F 25/0007* (2013.01); *F02D 41/187* (2013.01); *F02D 41/222* (2013.01); *Y02T 10/40* (2013.01)

(58) Field of Classification Search
CPC ........................ G01F 25/0007; G01F 25/0053
See application file for complete search history.

(56) References Cited

U.S. PATENT DOCUMENTS

| | | | |
|---|---|---|---|
| 6,349,592 B1 * | 2/2002 | Hirasawa et al. .......... | 73/114.33 |
| 6,944,531 B2 | 9/2005 | Takizawa et al. | |
| 6,983,734 B2 | 1/2006 | Muto | |
| 2006/0287806 A1 * | 12/2006 | Hori .............................. | 701/114 |

FOREIGN PATENT DOCUMENTS

| | | |
|---|---|---|
| EP | 1 302 645 A2 | 4/2003 |
| JP | 2-301641 A | 12/1990 |
| JP | 2004-19450 A | 1/2004 |

(Continued)

OTHER PUBLICATIONS

Chinese Office Action dated Sep. 26, 2014, 7 pgs.

*Primary Examiner* — Paul West
(74) *Attorney, Agent, or Firm* — Foley & Lardner LLP (57) ABSTRACT

Disclosed is a fault diagnosis apparatus for an airflow meter for determining that the airflow meter has a fault when a divergence ratio, i.e., a divergence value of an estimated intake-air quantity with respect to an actual intake-air quantity obtained by the airflow meter is greater than a fault-determination reference value determined based on a rotation speed of an internal combustion engine. As the engine speed reduces, an upper-limit diagnosis criterion increases and a lower-limit diagnosis criterion decreases, so as to narrow an area for determining that the airflow meter has a fault. Hence, the fault diagnosis for the airflow meter can be performed in the entire engine rotation speed range, i.e., in the entire operation range of the internal combustion engine, thus preventing a deterioration in the exhaust performance, which may occur owing to a failure in the airflow meter, beforehand.

9 Claims, 4 Drawing Sheets

(56) References Cited

FOREIGN PATENT DOCUMENTS

| JP | 2004-92614 A | 3/2004 |
| JP | 2006-329138 A | 12/2006 |
| JP | 2009-264327 A | 11/2009 |
| JP | 2010-48133 A | 3/2010 |
| JP | 2010-048133 A | 3/2010 |

* cited by examiner

FIG.1

1 ... INTERNAL COMBUSTION ENGINE
2 ... COMBUSTION CHAMBER
3 ... INTAKE-AIR INLET
4 ... INTAKE-AIR PASSAGE
5 ... AIR CLEANER
6 ... THROTTLE VALVE
7 ... COLLECTOR
8 ... INTAKE PORT
9 ... ATMOSPHERIC PRESSURE SENSOR
10 ... INTAKE-AIR TEMPERATURE SENSOR
11 ... AIRFLOW METER
12 ... INTAKE-AIR PRESSURE SENSOR
13 ... FUEL INJECTION VALVE
14 ... INTAKE VALVE
15 ... EXHAUST PORT
16 ... EXHAUST VALVE
17 ... ECU
18 ... CRANKANGLE SENSOR
19 ... THROTTLE SENSOR
20 ... VEHICLE SPEED SENSOR

FAULT DIAGNOSIS APPARATUS FOR AIRFLOW METER

TECHNICAL FIELD

The present invention relates to a fault diagnosis apparatus for an airflow meter which apparatus is configured to perform a fault diagnosis for an airflow meter in an entire operation range of an internal combustion engine.

BACKGROUND ART

When, owing to an intake air quantity sensor failure, the detected intake air quantity includes an error, inappropriate fuel injection is performed. This leads to toxic substance release to the atmosphere.

For instance, Patent document 1 discloses a fault diagnosis apparatus configured to determine that an airflow sensor has a fault when an absolute value of the difference between the estimated intake air flow rate estimated by an intake air quantity estimation means and the actual intake air flow rate measured by the airflow sensor is greater than a value that the absolute value cannot usually take or a predetermined value G0 determined based on an engine rotation speed and engine load.

However, when the throttle opening becomes a low opening position or when the rotation speed of the internal combustion engine becomes low (i.e., in the operation range of low intake air quantities), even with the airflow meter unfailed, there is a risk that the actual intake air quantity greatly diverges in a direction for increasing or decreasing of a divergence value from the estimated intake air quantity owing to intake air pulsating flow.

That is, in the fault diagnosis apparatus for the airflow meter, as disclosed in Patent document 1, dispersions of the detected values of the airflow meter in the operation range of low intake air quantities, were not taken into account. For instance, suppose that the predetermined value G0 is set to a smaller value for the purpose of improving the fault-diagnosis accuracy. In this case, in the operation range of low intake air quantities, it is easy to cause a decision error (a diagnosis error). This leads to the problem that the airflow-meter fault diagnosis has to be halted in the operation range of low intake air quantities to prevent such a decision error.

CITATION LIST

Patent Literature

Patent document 1: Japanese patent provisional publication No. 2006-329138 (A)

SUMMARY OF INVENTION

It is, therefore, in view of the above-mentioned disadvantages, an object of the invention to provide a fault diagnosis apparatus for an airflow meter capable of determining whether the airflow meter has a fault, even in the operation range of low intake air quantities.

In a fault diagnosis apparatus for an airflow meter, which apparatus is configured to determine that the airflow meter has a fault when a divergence value of an estimated intake air quantity with respect to an actual intake air quantity obtained by the airflow meter is greater than a fault determination reference value determined based on a rotation speed of an internal combustion engine, the apparatus of the invention is further configured to increase the fault determination reference value for determining that the airflow meter has a fault, as the rotation speed of the internal combustion engine reduces, thereby permitting an area for determining that the airflow meter has a fault to be narrowed.

According to the invention, in the operation range of low intake air quantities, in which, even with the airflow meter operating normally, dispersions of the detected values of the airflow meter become great, the fault determination area for determining that the airflow meter has a fault is set to be relatively narrow. Hence, the fault diagnosis for the airflow meter can be performed in the entire engine rotation speed range, i.e., in the entire operation range of the internal combustion engine, while avoiding an erroneous diagnosis. Thus, it is possible to prevent a deterioration in the exhaust performance, which may occur owing to a failure in the airflow meter, beforehand.

DESCRIPTION OF EMBODIMENTS

The embodiment of the invention is hereinafter described in detail in reference to the drawings.

Figure 1:
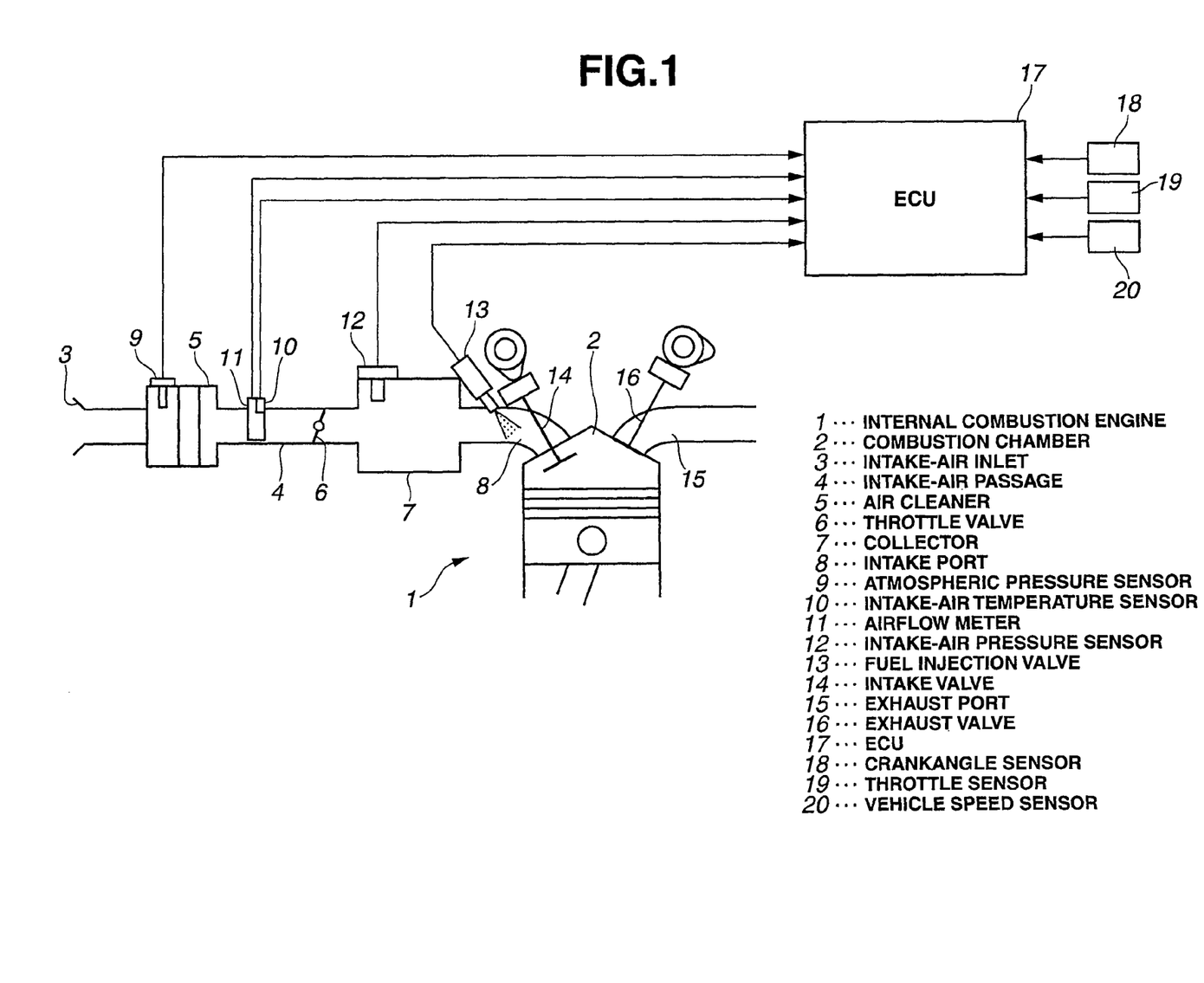
FIG. 1 is an explanatory view illustrating the system configuration of an internal combustion engine to which the invention can be applied.

FIG. 1 is the explanatory view illustrating the system configuration of an internal combustion engine to which the invention can be applied.

Air, which is drawn from an intake-air inlet 3 opened to the atmosphere, is introduced into a combustion chamber 2 of the internal combustion engine 1 by way of an intake-air passage 4.

An air cleaner 5, a throttle valve 6, and a collector 7 are disposed in the intake-air passage 4, and arranged in that order from the upstream side. Air is introduced into the combustion chamber 2 through an intake port 8 provided for each individual engine cylinder, placed downstream of the collector 7.

An atmospheric pressure sensor 9 is attached to the air cleaner 5 for detecting an atmospheric pressure. An airflow meter 11 having a built-in intake-air temperature sensor 10, such as a hot-wire thermal type flow-meter or a hot-film thermal type flow-meter, is placed between the air cleaner 5 and the throttle valve 6.

An individual fuel injection valve 13 is provided for each engine-cylinder intake port 8, for injecting and supplying fuel to the respective engine cylinder. An intake valve 14 is provided at the downstream end of the intake port. An exhaust valve 16 is provided at the upstream end of an exhaust port 15 connected to the combustion chamber 2.

An intake-valve side valve actuation mechanism, which drives each intake valve 14, is constructed by a variable valve actuation mechanism (not shown) capable of changing valve timing of intake valve 14. The variable valve actuation mechanism is also configured to control a quantity of valve overlap between intake valve 14 and exhaust valve 16 by changing (phase-retarding or phase-advancing) valve-open timing and valve closure timing of intake valve 14. Actually, as the variable valve actuation mechanism, a variable phase control mechanism configured to retard and advance an angular phase at a peak lift of intake valve 14, or a variable lift and working angle (event timing) control mechanism configured to change both a valve lift and a working angle of intake valve 14, or a combined system of the variable phase control mechanism and the variable lift and working angle control mechanism may be used.

An exhaust-valve side valve actuation mechanism, which drives each exhaust valve 16, is constructed by a typical direct-acting cam equipped valve actuation mechanism, in which a valve lift, a working angle, and an angular phase at a peak lift of the exhaust valve are all fixed. By the way, in a similar manner to the intake-valve side, a variable valve actuation mechanism may be applied to the exhaust-valve side valve actuation mechanism.

Informational data signals from atmospheric pressure sensor 9, intake-air temperature sensor 10, airflow meter 11, and intake-air pressure sensor 12 are inputted to an electronic engine control unit (abbreviated to "ECU") 17.

ECU 17 comprises a built-in microcomputer, capable of handling various control actions for the internal combustion engine 1. Actually, the ECU is configured to execute, based on the signals from various sensors, control processing. In addition to informational signals from the previously-discussed atmospheric pressure sensor 9, intake-air temperature sensor 10, airflow meter 11, and intake-air pressure sensor 12, informational signals from a crankangle sensor 12 configured to detect an engine rotation speed as well as a crankangle, a throttle sensor 19 configured to detect a degree of throttle opening of throttle valve 6, and a vehicle speed sensor 20 configured to detect a vehicle speed, and the like are inputted as various engine/vehicle sensor signal inputs.

Within the ECU 17, a processor allows the access of these detected signals for controlling an injection quantity and injection timing of fuel injection valve 13, ignition timing of an individual spark plug (not shown), a valve lift characteristic produced by of the variable valve actuation mechanism (not shown), the degree of throttle opening of throttle valve 6, and the like. Also, by means of the ECU 17, arithmetic processing for estimating an intake air quantity without using any detected value of airflow meter 11 and a fault diagnosis for airflow meter 11 are realized.

In diagnosing whether airflow meter 11 has a fault, a divergence value of an estimated intake air quantity estimated by ECU 17 with respect to an actual intake air quantity, i.e., the detected value of airflow meter 11, is compared to a fault determination reference value predetermined based on the engine rotation speed. When the divergence value is greater than the fault determination reference value, it is determined that airflow meter 11 has a fault.

Figure 2:
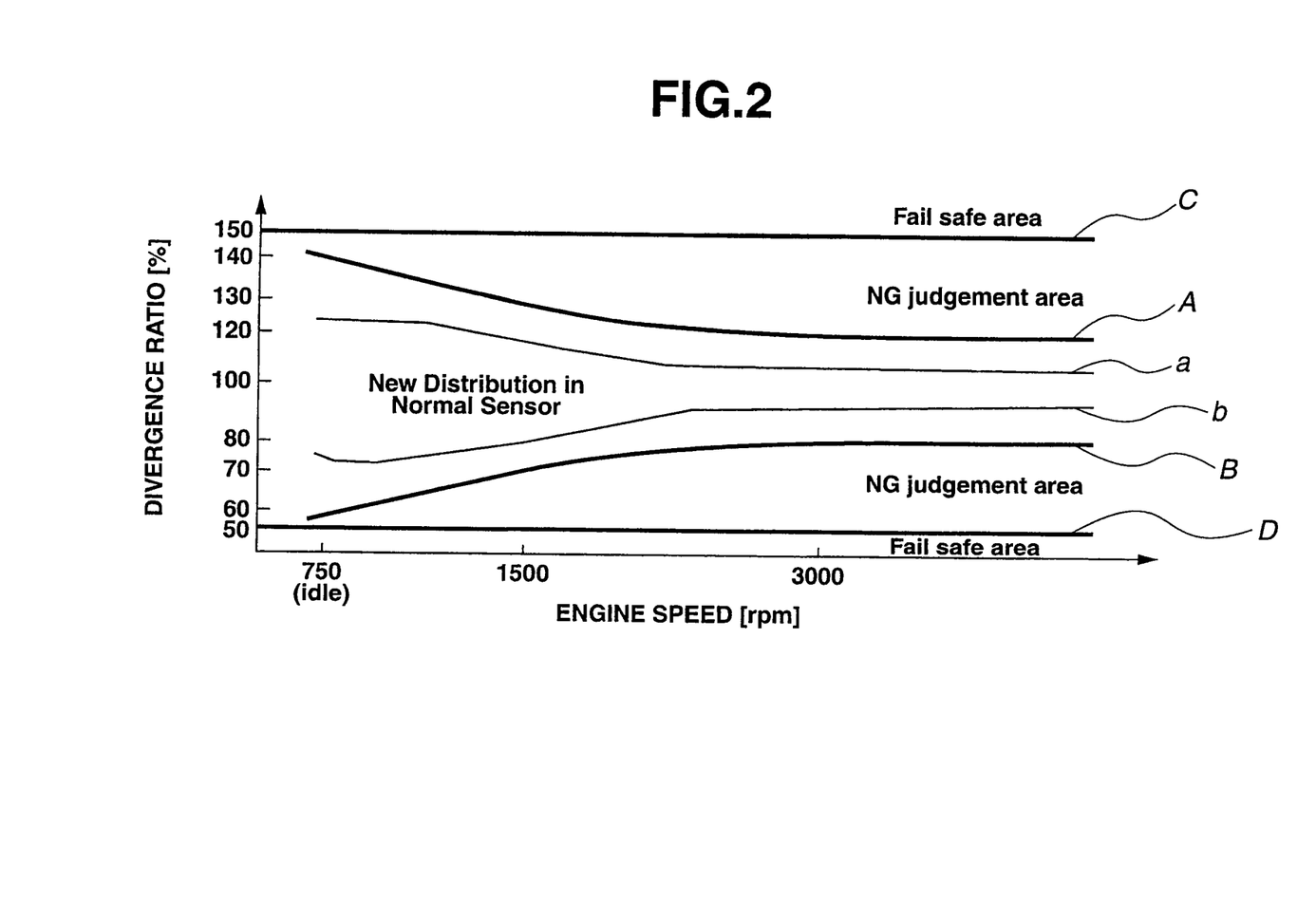
FIG. 2 is an explanatory view illustrating the outline of a fault determination for the airflow meter, in the apparatus of the invention.

In the shown embodiment, a divergence ratio, obtained by dividing the actual intake air quantity by the estimated intake air quantity, is actually used as the previously-noted divergence value. Concretely, as shown in FIG. 2, when the divergence ratio becomes kept outside of the specified area sandwiched between an upper-limit fault diagnosis criterion (see the characteristic curve "A" in FIG. 2) and a lower-limit fault diagnosis criterion (see the characteristic curve "B" in FIG. 2), which criteria are used as the upper-limit and lower-limit fault determination reference values respectively, it is determined that airflow meter 11 has a fault. That is, the characteristic curve A in FIG. 2 is the upper-limit fault diagnosis criterion corresponding to the upper-limit fault determination reference value, whereas the characteristic curve B in FIG. 2 is the lower-limit fault diagnosis criterion corresponding to the lower-limit fault determination reference value.

For instance, even in the case of airflow meters, each operating normally, the measured values of these airflow meters tend to involve individual differences of induction-system component parts. Hence, a margin, corresponding to the individual differences of induction-system component parts, is fully taken into account. More concretely, the given positive margin is added to the upper limit (see the characteristic curve "a" in FIG. 2) that the divergence ratio can take, whereas the given negative margin is added to the lower limit (see the characteristic curve "b" in FIG. 2) that the divergence ratio can take.

In a situation of low intake air quantities, even with the airflow meter 11 unfailed, there is a risk that the detected intake air quantity (i.e., the actual intake air quantity), measured by airflow meter 11, greatly diverges from the estimated intake air quantity, calculated by ECU 17, owing to intake air pulsating flow. Thus, the fault diagnosis criteria are set such that the upper-limit fault diagnosis criterion increases, and that the lower-limit fault diagnosis criterion decreases, as the engine rotation speed reduces.

In the shown embodiment, when the divergence ratio is greater than the upper-limit fault diagnosis criterion or when the divergence ratio is less than the lower-limit fault diagnosis criterion, it is determined that airflow meter 11 has a fault. When it has been determined that airflow meter 11 has a fault, an alarm lamp, which lamp is installed in a position that can be visually recognized by the driver, for example, on an instrument cluster, is turned ON, thereby giving the driver a warning that airflow meter 11 has a fault (an abnormality).

Additionally, in the shown embodiment, when the previously-noted divergence ratio is within the specified area less than or equal to the upper-limit fault diagnosis criterion and greater than or equal to the lower-limit fault diagnosis criterion, and the engine rotation speed is higher than or equal to a predetermined rotation speed (for example, 3000 revolutions per minute), it is determined that airflow meter 11 is normal.

As the intake air quantity increases, the detected intake air quantity becomes hard to be affected by intake air pulsating flow. Thus, with the airflow meter 11 unfailed, there is a less risk for the intake air quantity (i.e., the actual intake air quantity), detected by airflow meter 11, greatly diverges from the estimated intake air quantity, calculated by ECU 17. That is, when the engine rotation speed is higher than or equal to the predetermined rotation speed, it is possible to accurately diagnose on whether the airflow meter is normal. Thus, the fault-diagnosis result can be switched to "normal" because of the fault-diagnosis result regarded as to be erroneous, even though there is a circumstance diagnosed as to be failed from engine starting until now. Hence, the fault-diagnosis accuracy can be enhanced and whereby it is possible to prevent the airflow meter 11 from being undesirably exchanged owing to an erroneous diagnosis.

Conversely when the engine rotation speed is less than the predetermined rotation speed, the fault diagnosis for the airflow meter cannot be necessarily performed accurately, and thus the current determination result of the fault diagnosis is retained unchanged. For instance, when there is a circumstance diagnosed as to be failed from engine starting until now, the diagnosis result diagnosed as a failure is maintained. In contrast when there is a circumstance diagnosed as to be normal, the diagnosis result diagnosed as to be normal is maintained. Hence, during a period of time from engine starting until now, assuming that the divergence ratio continues to exist within the specified area less than or equal to the upper-limit fault diagnosis criterion and greater than or equal to the lower-limit fault diagnosis criterion, and the engine rotation speed continues to be less than the predetermined rotation speed (for example, 3000 revolutions per minute), the state, in which the diagnosis result does not exist, will be continuously maintained.

In this manner, it is determined, based on the engine rotation speed, whether the airflow meter is normal or the current determination result of the fault diagnosis is maintained, thus improving the fault-diagnosis accuracy. Hence, it is possible to prevent airflow meter 11 from being undesirably exchanged owing to an erroneous diagnosis irrespective of the case that the airflow meter is not necessarily failed.

By the way, it is unnecessary to necessarily tell the driver about whether or not airflow meter 11 is normal. That is, in the case that airflow meter 11 is normal, it is unnecessary for the normally-operating airflow meter to be sensed by the driver by turning the lamp ON. However, in the case that it has been determined that airflow meter 11 has a failure, a worker, who exchanges the airflow meter 11 determined as a failure in a repair shop, can connect a specified service tool to the ECU 17, and then he can verify whether or not airflow meter 11 is normal, by running the internal combustion engine 1 at speeds higher than or equal to the predetermined rotation speed.

In the shown embodiment, an upper-limit failsafe diagnosis criterion (an upper-limit failsafe determination reference value) and a lower-limit failsafe diagnosis criterion (a lower-limit failsafe determination reference value) are further set outside of upper-limit and lower-limit fault diagnosis criteria shown in FIG. 2. When the previously-discussed divergence ratio is greater than the upper-limit failsafe diagnosis criterion (see the characteristic curve "C" in FIG. 2), or when the divergence ratio is less than the lower-limit failsafe diagnosis criterion (see the characteristic curve "D" in FIG. 2), a shift from "normal control", in which control variables, for example an injection quantity and injection timing of fuel injection valve 13, ignition timing of an individual spark plug (not shown) and the like are calculated based on the detected intake air quantity measured by airflow meter 11 so as to control, based on the calculated control variables, the internal combustion engine 11, to "failsafe control", in which the same control variables as the "usual control" are calculated using an intake air quantity derived from the rotation speed and the degree of throttle opening of the internal combustion engine so as to control, based on the calculated control variables, the internal combustion engine 11, occurs.

In the shown embodiment, the upper-limit failsafe diagnosis criterion is the divergence ratio of 150%, whereas the lower-limit failsafe diagnosis criterion is the divergence ratio of 50%.

That is to say, the failsafe control system of the embodiment is configured to initiate the failsafe control, when, regarding the divergence ratio, a 50% or more deviation of the detected actual intake air quantity measured by airflow meter 11 from the estimated intake air quantity estimated by ECU 17 occurs.

By the way, in a situation where there is a risk that the detected intake air quantity (i.e., the actual intake air quantity), measured by airflow meter 11, greatly diverges from the estimated intake air quantity, calculated by ECU 17, such as during a quick accelerating state or during a particular operational state where there is no torque outputted by internal combustion engine 1 (e.g., during an engine-braking state or during a coasting state of the vehicle), in other words, when a diagnosis permission condition (described later) is unsatisfied, a fault diagnosis for airflow meter 11 is disabled (inhibited).

Figure 3:
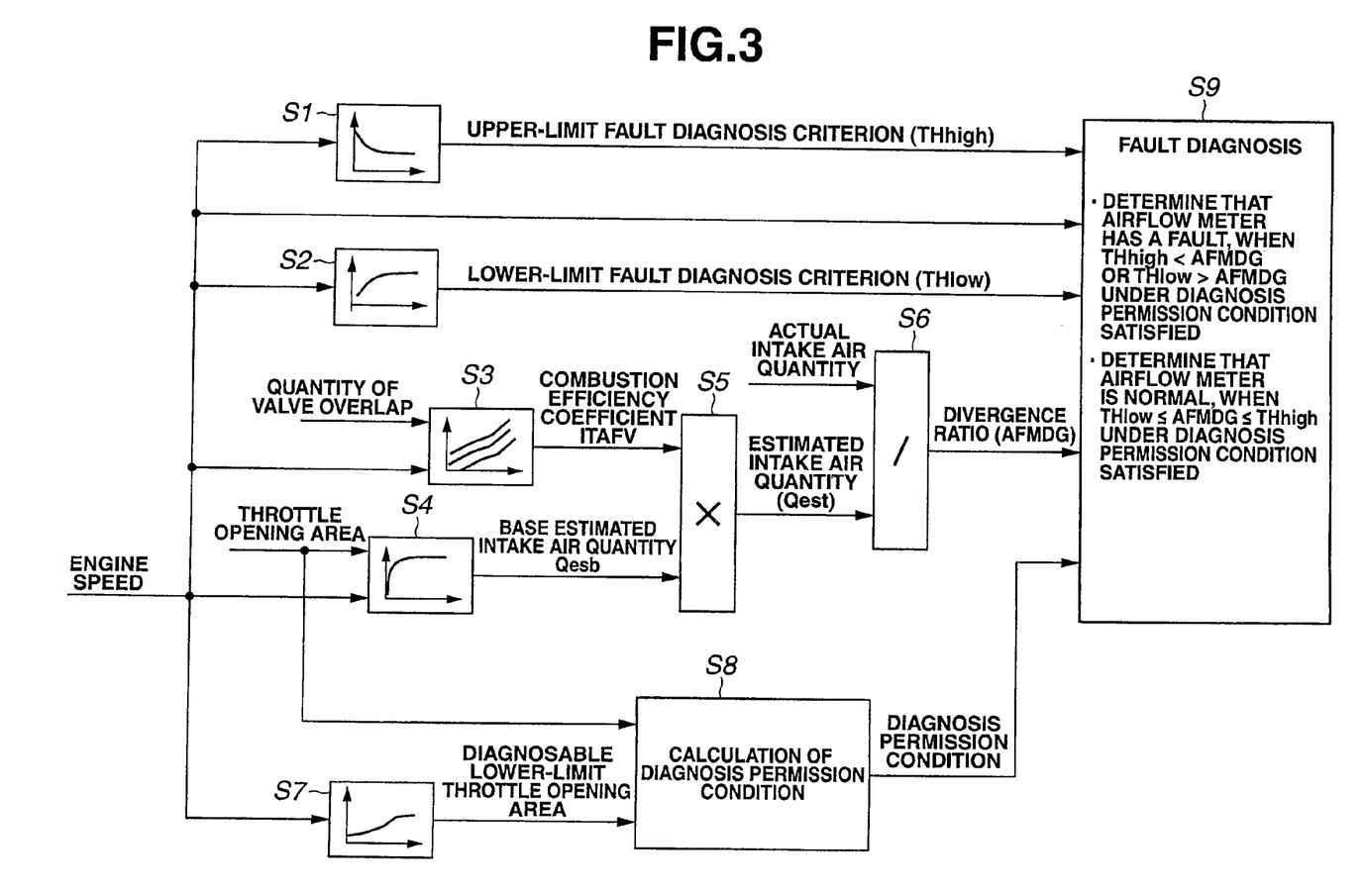
FIG. 3 is a block diagram illustrating a fault-diagnosis method for the airflow meter.

Referring to FIG. 3, there is shown the block diagram illustrating the fault-diagnosis method for airflow meter 11.

At step S1, the upper-limit fault diagnosis criterion THhigh is calculated based on the engine rotation speed. At step S2, the lower-limit fault diagnosis criterion THlow is calculated based on the engine rotation speed. Upper-limit and lower-limit fault diagnosis criteria THhigh and THlow are calculated by retrieval from an experimentally predetermined lookup table (not shown).

At step S3, a combustion efficiency coefficient ITAFV is calculated, based on both the engine rotation speed and the quantity of valve overlap between intake valve 14 and exhaust valve 16, by retrieval from an experimentally predetermined lookup table (not shown). By the way, the quantity of valve overlap can be calculated by means of a position sensor (not shown) attached to the variable valve actuation mechanism by detecting valve timing of the engine valve (intake valve 14 or exhaust valve 16).

At step S4, a base estimated intake air quantity Qesb is calculated, based on both the engine rotation speed and the throttle opening area, by retrieval from an experimentally predetermined lookup table (not shown). The throttle opening area can be calculated, using the detected signal value from throttle sensor 19.

At step S5, an estimated intake air quantity Qest is calculated by multiplying the combustion efficiency coefficient ITAFV, calculated through step S3, by the base estimated intake air quantity Qesb, calculated through step S4. In lieu thereof, the estimated intake air quantity Qest may be estimated, using the intake-air pressure. Concretely, the estimated intake air quantity Qest, estimated based on the intake-air pressure detected by intake-air pressure sensor 12, may be used.

At step S6, a divergence ratio AFMDG, corresponding to a divergence value of the estimated intake air quantity with respect to the actual intake air quantity, is calculated by dividing the detected intake air quantity (i.e., the actual intake air quantity) of airflow meter 11 by the estimated intake air quantity Qest calculated through step S5.

At step S7, a diagnosable lower-limit throttle opening area is calculated, based on the engine rotation speed, by retrieval from an experimentally predetermined lookup table (not shown).

At step S8, a diagnosis permission condition is calculated. The term "diagnosis permission condition" means essential prerequisites for determining whether the vehicle operational state is a failure diagnosis executable state for airflow meter 11. When the diagnosis permission condition is satisfied, a fault diagnosis for airflow meter 11 is executed.

In the shown embodiment, when the throttle opening area is greater than or equal to the diagnosable lower-limit throttle opening area, and a change in the throttle opening area is greater than or equal to a predetermined value, it is determined that the diagnosis permission condition is satisfied.

That is, when the throttle opening area is less than the diagnosable lower-limit throttle opening area, it is determined that the vehicle operational state is a particular operational state where there is no torque outputted by internal combustion engine 1. Thus, it is determined that the diagnosis permission condition is unsatisfied. Also, when a change in the throttle opening area exceeds the predetermined value, it is determined that the vehicle is in a quick accelerating state. Thus, it is determined that the diagnosis permission condition is unsatisfied.

At step S9, when the diagnosis permission condition is satisfied and when the divergence ratio AFMDG calculated through step S6 is greater than the upper-limit fault diagnosis criterion THhigh calculated through step S1 or the divergence ratio AFMDG calculated through step S6 is less than the lower-limit fault diagnosis criterion THlow calculated through step S2, it is determined that airflow meter 11 has a fault.

When the diagnosis permission condition is satisfied and when the divergence ratio AFMDG is less than or equal to the upper-limit fault diagnosis criterion THhigh and greater than or equal to the lower-limit fault diagnosis criterion THlow, and when the rotation speed of internal combustion engine 1 is higher than or equal to the predetermined rotation speed, it is determined that airflow meter 11 is normal.

Figure 4:
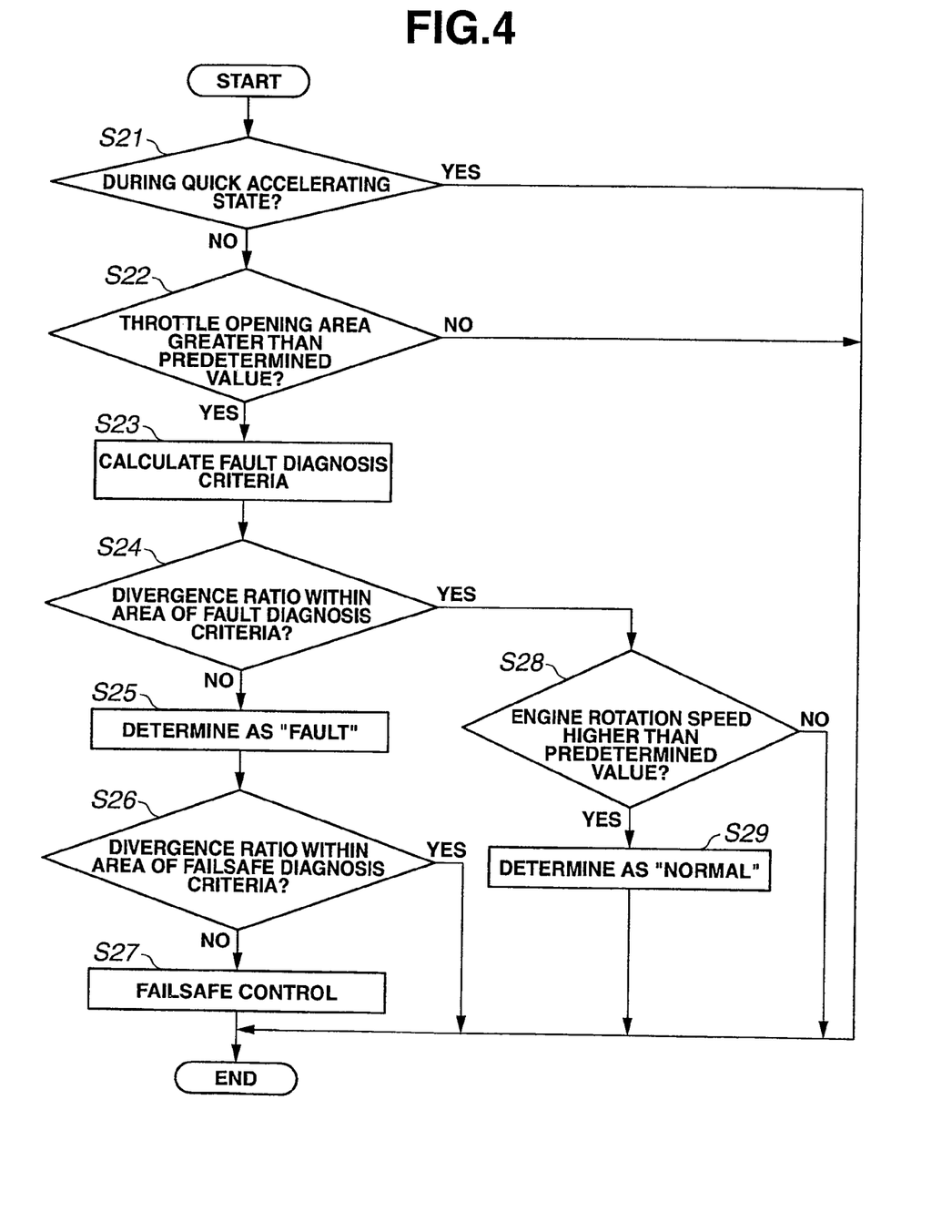
FIG. 4 is a flowchart illustrating a control flow of the fault-diagnosis method.

Referring to FIG. 4, there is shown the flowchart illustrating the control flow of the fault-diagnosis method for airflow meter 11.

At step S21, a check is made to determine whether the vehicle is in a quick accelerating state. When the vehicle is out of a quick accelerating state, the routine proceeds to step S22. Conversely when the vehicle is in a quick accelerating state, the current routine terminates without executing a fault diagnosis.

At step S22, a check is made to determine whether the throttle opening area is greater than or equal to the predetermined value. When the opening area of throttle valve 6 is greater than or equal to the predetermined value, the routine proceeds to step S23. Conversely when the opening area of throttle valve 6 is less than the predetermined value, the current routine terminates. These steps S21 and S22 are provided to determine whether respective prerequisites of the diagnosis permission condition are satisfied.

At step S23, upper-limit and lower-limit fault diagnosis criteria THhigh and THlow are calculated based on the rotation speed of internal combustion engine 1.

At step S24, a check is made to determine whether the divergence ratio AFMDG is within a specified area ranging from the lower-limit fault diagnosis criterion THlow to the upper-limit fault diagnosis criterion THhigh, that is, THlow≤AFMDG≤THhigh. When the condition defined by THlow≤AFMDG≤THhigh is satisfied, the routine proceeds to step S28. Conversely when the condition defined by THlow≤AFMDG≤THhigh is unsatisfied, the routine proceeds to step S25.

At step S25, it is determined that airflow meter 11 has a fault, and then the routine proceeds to step S26. By the way, when step S25 determines that airflow meter 11 has a fault, an alarm lamp is turned ON.

At step S26, a check is made to determine whether the divergence ratio AFMDG is within a specified area defined by the failsafe diagnosis criteria. That is, a check is made to determine whether the divergence ratio AFMDG is greater than the upper-limit failsafe diagnosis criterion or the divergence ratio AFMDG is less than the lower-limit failsafe diagnosis criterion.

When the divergence ratio AFMDG is kept outside of the specified area sandwiched between the failsafe diagnosis criteria, the routine proceeds to step S27. Conversely when the divergence ratio AFMDG is kept within the specified area of the failsafe diagnosis criteria, the current routine terminates.

At step S27, a shift from "normal control" based on the detected intake air quantity measured by airflow meter 11 to "failsafe control" based on the intake air quantity derived from the rotation speed and the degree of throttle opening of internal combustion engine 1 occurs.

At step S28, a check is made to determine whether the rotation speed of internal combustion engine 1 is higher than or equal to the predetermined rotation speed (e.g., 3000 revolutions per minute). When the rotation speed of internal combustion engine 1 is higher than or equal to the predetermined rotation speed, the routine proceeds to step S29, and then it is determined that airflow meter 11 is normal. Conversely when the rotation speed of internal combustion engine 1 is less than the predetermined rotation speed (e.g., 3000 revolutions per minute), the current determination result of the fault diagnosis is retained unchanged, and hence the current routine terminates.

By the way, the control mode of internal combustion engine 1, executed when the control routine of FIG. 4 terminates without passing through step S27, is placed into the "normal control". That is, the intake air quantity control shifts to the "failsafe control", only when the routine proceeds from step S26 to step S27.

As set forth above, in the embodiment, it is possible to remove the operation range, in which airflow meter 11 is normally operating but dispersions of the measured values of the airflow meter exist, from the fault determination area for determining or diagnosing that airflow meter 11 has a fault by narrowing the fault determination area for airflow meter 11 even in the low rotation speed range of internal combustion engine 1 that the intake air quantity is comparatively low. That is to say, in the operation range of low intake air quantities, in which, even with the airflow meter 11 operating normally, there is a risk that the detected intake air quantity (i.e., the actual intake air quantity), measured by airflow meter 11, greatly diverges from the estimated intake air quantity, calculated by ECU 17, the fault determination area for determining that airflow meter 11 has a fault (i.e., an area above the upper-limit fault diagnosis criterion and an area below the lower-limit fault diagnosis criterion in FIG. 2) is set to be relatively narrow. Hence, the fault diagnosis for airflow meter 11 can be performed in the entire engine rotation speed range, i.e., in the entire operation range of internal combustion engine 1, while avoiding an erroneous diagnosis. Thus, it is possible to prevent a deterioration in the exhaust performance, which may occur owing to a failure in airflow meter 1, beforehand.

Immediately when it has been determined that airflow meter 11 has a fault, an alarm lamp is turned ON, thereby giving the vehicle occupants a warning that airflow meter 11 has a fault. Thus, prompt inspection and repair of the vehicle can be demanded from the driver. Accordingly, it is possible to prevent air pollution from advancing owing to continuous running of the engine under the deteriorated state of the exhaust performance.

When the detected intake air quantity (i.e., the actual intake air quantity), measured by airflow meter 11, remarkably greatly diverges from the estimated intake air quantity, calculated by ECU 17, that is, when the divergence value becomes kept outside of the specified area sandwiched between the upper-limit failsafe diagnosis criterion and the lower-limit failsafe diagnosis criterion, a shift from "normal control" based on the detected intake air quantity measured by airflow meter 11 to "failsafe control" based on the intake air quantity derived from the rotation speed and the degree of throttle opening of internal combustion engine 1 occurs. Thus, it is possible to prevent continuous running of the engine under the remarkably deteriorated state of the exhaust performance.

Even with the airflow meter 11 operating normally, the previously-discussed divergence value may greatly diverge from the reference value (i.e., 100%) owing to some kind of trouble in the induction system except the airflow meter 11. For instance, in the presence of air leakage from the intake air passage or with the clogging air cleaner 5, the divergence value between the detected intake air quantity, measured by airflow meter 11, and the estimated intake air quantity tends to become great, even though the detected value of airflow meter 11 is accurate. In contrast, in the embodiment, the area for determining that airflow meter 11 is normal in terms of the divergence value (the divergence ratio), which area exists within the area sandwiched between the characteristic curve "A" and the characteristic curve "B", and simultaneously exists within the area that the engine rotation speed is higher than or equal to the predetermined rotation speed, is appropriately set as discussed above. Hence, when the divergence ratio is kept outside of the specified area sandwiched between the characteristic curve "A" and the characteristic curve "B" in the operation range at engine rotation speed higher than the predetermined rotation speed after airflow meter 11 has been replaced with a new airflow meter on the basis of the result of determination that airflow meter 11 has a fault, it is possible to determine that there is a trouble in the induction system except the newly replaced airflow meter.

In the shown embodiment, the divergence ratio, obtained by dividing the actual intake air quantity by the estimated intake air quantity, is used as the divergence value of the estimated intake air quantity estimated by ECU 17 with respect to the actual intake air quantity, i.e., the detected value of airflow meter 11. The divergence value is not limited to the previously-discussed divergence ratio. In lieu thereof, the difference between the actual intake air quantity and the estimated intake air quantity or the divergence degree of the estimated intake air quantity from the actual intake air quantity may be used as the divergence value, so as to perform a fault diagnosis for airflow meter 11.

Also, in the embodiment, an engine rotation speed threshold value, needed to determine whether airflow meter 11 is normal, is set appropriately depending on a real machine.

Furthermore, in the embodiment, an operational state where the vehicle is out of a quick accelerating state, and an operational state where internal combustion engine 1 outputs torque are used as essential prerequisites of the diagnosis permission condition for determining whether the vehicle operational state is a failure diagnosis executable state for airflow meter 11. In addition to the previously-discussed diagnosis permission condition, a prerequisite that 10 seconds have expired after engine starting (in other words, a prerequisite that activation of airflow meter 11 has been completed), a prerequisite that the intake-air temperature becomes higher than or equal to 10° C., a prerequisite that the atmospheric pressure becomes higher than or equal to 50 kPa, and a prerequisite that the engine is out of a fuel-cutoff mode may be added to the necessary prerequisites of the diagnosis permission condition. A fault diagnosis for airflow meter 11 may be executed, only when these prerequisites of the diagnosis permission condition are all satisfied.

The invention claimed is:

1. A fault diagnosis apparatus for an airflow meter for detecting an actual intake air quantity, comprising:
    means for detecting a rotation speed of an internal combustion engine;
    means for estimating an intake air quantity; and
    a control unit configured to:
        determine the airflow meter has a fault when a divergence value between an estimated intake air quantity calculated by the means for estimating the intake air quantity and an actual intake air quantity obtained by the airflow meter is greater than a fault determination reference value determined based on the rotation speed of the internal combustion engine;
        calculate the estimated intake air quantity by correcting a base estimated intake air quantity based on both the rotation speed and a degree of throttle opening of the internal combustion engine by a quantity of valve overlap between an intake valve and an exhaust valve as an operation control parameter of the internal combustion engine except both the rotation speed and the degree of throttle opening; and
        increase the fault determination reference value for determining that the airflow meter has a fault, as the rotation speed of the internal combustion engine decreases, thereby permitting an area for determining that the airflow meter has a fault to be narrowed.

2. The fault diagnosis apparatus for an airflow meter as claimed in claim 1, wherein the control unit is further configured to:
    determine that the airflow meter is normal when the rotation speed of the internal combustion engine is higher than or equal to a predetermined engine rotation speed under a specific condition that the divergence value between the estimated intake air quantity and the actual intake air quantity is less than or equal to the fault determination reference value; and
    maintain a current determination result when the rotation speed of the internal combustion engine is less than the predetermined engine rotation speed under the specific condition.

3. The fault diagnosis apparatus for an airflow meter as claimed in claim 1, wherein the control unit is further configured to:
    control the internal combustion engine, using an intake air quantity derived from the rotation speed and the degree of throttle opening of the internal combustion engine, when the divergence value between the actual intake air quantity and the estimated intake air quantity is greater than a failsafe determination reference value, set to be greater than the fault determination reference value; and
    control the internal combustion engine, using the actual intake air quantity, when the divergence value between the actual intake air quantity and the estimated intake air quantity is kept equal to or less than the failsafe determination reference value.

4. A fault diagnosis apparatus for an airflow meter for detecting an actual intake air quantity, comprising:
    a rotation-speed detector configured to detect a rotation speed of an internal combustion engine;
    an intake-air-quantity estimator configured to estimate an intake air quantity; and
    a control unit configured to:
        determine the airflow meter has a fault when a divergence value between an estimated intake air quantity calculated by the intake-air-quantity estimator and an actual intake air quantity obtained by the airflow meter is greater than a fault determination reference value determined based on the rotation speed of the internal combustion engine;
        calculate the estimated intake air quantity by correcting a base estimated intake air quantity based on both the rotation speed and a degree of throttle opening of the internal combustion engine by a quantity of valve overlap between an intake valve and an exhaust valve as an operation control parameter of the internal combustion engine except both the rotation speed and the degree of throttle opening; and
        increase the fault determination reference value for determining that the airflow meter has a fault, as the rotation speed of the internal combustion engine decreases, thereby permitting an area for determining that the airflow meter has a fault to be narrowed.

5. The fault diagnosis apparatus for an airflow meter as claimed in claim 4, wherein the control unit is further configured to:
  determine that the airflow meter is normal when the rotation speed of the internal combustion engine is higher than or equal to a predetermined engine rotation speed under a specific condition that the divergence value between the estimated intake air quantity and the actual intake air quantity is less than or equal to the fault determination reference value; and
  maintain a current determination result when the rotation speed of the internal combustion engine is less than the predetermined engine rotation speed under the specific condition.

6. The fault diagnosis apparatus for an airflow meter as claimed in claim 4, wherein the control unit is further configured to:
  control the internal combustion engine, using an intake air quantity derived from the rotation speed and the degree of throttle opening of the internal combustion engine, when the divergence value between the actual intake air quantity and the estimated intake air quantity is greater than a failsafe determination reference value, set to be greater than the fault determination reference value; and
  control the internal combustion engine, using the actual intake air quantity, when the divergence value between the actual intake air quantity and the estimated intake air quantity is kept equal to or less than the failsafe determination reference value.

7. A fault diagnosis apparatus for an airflow meter for detecting an actual intake air quantity, comprising:
  a rotation-speed detector configured to detect a rotation speed of an internal combustion engine;
  an intake-air-quantity estimator configured to estimate an intake air quantity; and
  a control unit configured to:
    determine the airflow meter has a fault when a divergence value between an estimated intake air quantity calculated by the intake-air-quantity estimator and an actual intake air quantity obtained by the airflow meter is kept outside of a specified area sandwiched between an upper-limit fault diagnosis criterion and a lower-limit fault diagnosis criterion, which criteria are determined based on the rotation speed of the internal combustion engine;
    calculate the estimated intake air quantity by correcting a base estimated intake air quantity based on both the rotation speed and a degree of throttle opening of the internal combustion engine by a quantity of valve overlap between an intake valve and an exhaust valve as an operation control parameter of the internal combustion engine except both the rotation speed and the degree of throttle opening; and
    increase the upper-limit fault diagnosis criterion and decrease the lower-limit fault diagnosis criterion, as the rotation speed of the internal combustion engine decreases, thereby permitting the specified area for determining that the airflow meter has a fault to be narrowed.

8. The fault diagnosis apparatus for an airflow meter as claimed in claim 7, wherein the control unit is further configured to:
  determine that the airflow meter is normal when the rotation speed of the internal combustion engine is higher than or equal to a predetermined engine rotation speed under a specific condition that the divergence value between the estimated intake air quantity and the actual intake air quantity is less than or equal to the upper-limit fault diagnosis criterion and greater than or equal to the lower-limit fault diagnosis criterion; and
  maintain a current determination result when the rotation speed of the internal combustion engine is less than the predetermined engine rotation speed under the specific condition.

9. The fault diagnosis apparatus for an airflow meter as claimed in claim 7, wherein the control unit is further configured to:
  control the internal combustion engine at a failsafe control mode, using an intake air quantity derived from the rotation speed and the degree of throttle opening of the internal combustion engine, when the divergence value between the actual intake air quantity and the estimated intake air quantity is kept outside of a specified area sandwiched between an upper-limit failsafe diagnosis criterion and a lower-limit failsafe diagnosis criterion, both set outside of the upper-limit and lower-limit fault diagnosis criteria; and
  control the internal combustion engine at a normal control mode, using the actual intake air quantity, when the divergence value between the actual intake air quantity and the estimated intake air quantity is kept within the specified area sandwiched between the upper-limit and lower-limit failsafe diagnosis criteria.

\* \* \* \* \*